(12) United States Patent
Yoshida

(10) Patent No.: US 7,540,816 B2
(45) Date of Patent: Jun. 2, 2009

(54) PLASTIC HYDRAULIC TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 41 days.

(21) Appl. No.: 11/451,784

(22) Filed: Jun. 13, 2006

(65) Prior Publication Data

US 2007/0032321 A1 Feb. 8, 2007

(30) Foreign Application Priority Data

Aug. 4, 2005 (JP) .............................. 2005-226825

(51) Int. Cl.
*F16H 7/22* (2006.01)
(52) U.S. Cl. .................................................. 474/110
(58) Field of Classification Search ............ 474/101, 474/109, 110, 111, 140; 411/456; 428/98, 428/99, 138, 139, 140
See application file for complete search history.

(56) References Cited

U.S. PATENT DOCUMENTS

| 4,832,664 | A |   | 5/1989  | Groger et al. |
|-----------|---|---|---------|---------------|
| 5,523,142 | A | * | 6/1996  | Bedoussac ................... 428/139 |
| 5,967,921 | A |   | 10/1999 | Simpson et al. |
| 6,482,116 | B1| * | 11/2002 | Ullein ......................... 474/111 |
| 7,077,772 | B2| * | 7/2006  | Hashimoto et al. .......... 474/109 |
| 2004/0092350 | A1 | * | 5/2004 | Hashimoto et al. .......... 474/110 |
| 2005/0090342 | A1 | * | 4/2005 | Yoshida ...................... 474/101 |
| 2007/0032323 | A1 | * | 2/2007 | Yoshida ...................... 474/110 |

FOREIGN PATENT DOCUMENTS

| EP | 0 916 869 A3 |   | 5/2001 |
| FR | 2800814 A1   | * | 5/2001 |
| JP | 11-223252    |   | 8/1999 |

* cited by examiner

*Primary Examiner*—Vicky A Johnson
(74) *Attorney, Agent, or Firm*—Howson & Howson LLP

(57) ABSTRACT

In a plastic hydraulic tensioner having an oil reservoir formed as a recess in a portion of a synthetic resin tensioner body adapted to engage a tensioner mounting surface on an engine block, metal bushings are insert-molded in the synthetic resin tensioner body for receiving mounting bolts by which the tensioner is secured to an engine block. The outer circumferential surface of each bushing is provided with at least one flat portion or at least one concave groove, and a protruding portion of the bushing is formed adjacent the end of the flat or groove remote from the engine block-contacting end of the bushing.

1 Claim, 9 Drawing Sheets

PLASTIC HYDRAULIC TENSIONER

CROSS-REFERENCE TO RELATED APPLICATION

This application claims priority on the basis of Japanese patent application 2005-226825, filed Aug. 4, 2005. The disclosure of Japanese application 2005-226825 is hereby incorporated by reference.

FIELD OF THE INVENTION

This invention relates to a hydraulic tensioner of the kind used to maintain proper tension in the timing chain of an automobile engine. The invention relates more specifically to improvements in a plastic hydraulic tensioner in which one or more metal bushings are incorporated into a synthetic resin tensioner body in order to accommodate mounting bolts by which the tensioner is attached to an engine block.

BACKGROUND OF THE INVENTION

In most hydraulic tensioners currently in use, a ferrous metal plunger is arranged to protrude slidably from a tensioner body composed of a metal such as cast iron, aluminum alloy or the like. The metal tensioner body has a large mass. Reduction of the overall weight of the tensioner can be achieved by utilizing a tensioner body composed of a synthetic resin. The tensioner in which the tensioner body is composed of a synthetic resin is generally known as a "plastic tensioner." An example of a plastic tensioner is described in U.S. Pat. No. 5,967,921, granted Oct. 19, 1999. A typical plastic tensioner is structurally complicated, and is difficult to manufacture.

To simplify the plastic tensioner and facilitate its manufacture, certain measures have been taken in conventional plastic tensioners. In the conventional plastic tensioner, a cylindrical metal tube is insert-molded in a hole in the synthetic resin tensioner body, forming a liner in which the plunger of the tensioner is slidable.

As in the case of a hydraulic tensioner having a metal body, a coil spring, in compression between a closed end of the plunger and the bottom of the hole in the tensioner body, biases the plunger in the protruding direction. The plunger, and the lined hole in the tensioner body cooperatively form a high-pressure oil chamber which receives oil under pressure, through a one-way check valve, from an oil reservoir formed in the tensioner body and communicating with a oil port in the engine block on which the tensioner is mounted.

In the plastic tensioner, bolts, for mounting the tensioner body on the engine block, extend through metal bushings which are insert-molded into the tensioner.

In the operation of the tensioner, the high pressure oil chamber is always filled with oil supplied through the oil reservoir. When the timing chain loosens, the biasing force exerted by the compression spring moves the plunger in the protruding direction. At the same time, the check valve opens, allowing oil to flows into the high pressure oil chamber from the oil reservoir. When tension is reestablished in the timing chain, and also when additional tension is imparted to the chain, for example by an impact force, the plunger is pushed into the tensioner body, but the check valve closes, limiting retracting movement of the plunger.

As shown in FIG. 13, in the conventional plastic hydraulic tensioner, a bolt 22 extends, through a metal bushing 26 insert-molded into the tensioner body 2, and is threaded into an engine block 21. The bushing should have an outer diameter at least as large as the diameter of the head of the bolt in order to avoid buckling of the bushing and to maintain the tensioner body stably fastened to the engine block. Two such insert-molded bushings and mounting bolts are provided.

The bushing 26 has a smooth outer circumferential surface. Vibrations of the engine can result in rotation of the bushing, which can, in turn, cause rotation of the bolt 22, causing the bolt to loosen. Even very feeble vibrations can result in loosening of the mounting bolts in this manner. Furthermore, insert-molding does not necessarily fix the tensioner body 2 firmly to the bushings. If the fit of tensioner body to the bushings becomes loose, the tensioner can separate from the engine block 21, as shown in FIG. 14, even while the bushings 26 and the bolts 22 are fixed to the engine block 21. The pressure of oil in the oil reservoir also exerts a force on the tensioner body (indicated by arrows in FIG. 13), urging the tensioner body away from the engine block as shown in FIG. 14. When the tensioner floats away from the engine block, a clearance d is created, through which oil can leak from the oil reservoir 16. When such leakage occurs, an adequate amount of oil may not be supplied to the high pressure oil chamber of the tensioner, and backlash in the chain drive can occur, resulting in the generation of backlash noise.

The invention addresses the above-mentioned problems by preventing an insert-molded metal bushing from rotating or becoming disconnected from the tensioner housing as a result of engine vibration. It ensures that the tensioner body remains firmly engaged with the tensioner mounting surface on the engine block on which the tensioner is mounted, and prevents leakage of oil that can result from separation of the tensioner body from the engine block.

SUMMARY OF THE INVENTION

The preferred hydraulic tensioner in accordance with the invention comprises a tensioner body composed of synthetic resin and having a hollow part formed therein for receiving a hollow cylindrical lining. The hollow part is open at one end and has a bottom. A hollow cylindrical lining is provided in the hollow part of the tensioner body. A hollow plunger is slidable in the cylindrical lining. The plunger has an open rear end, and a closed front end protruding from the cylindrical lining. The hollow part of the plunger, the cylindrical lining, and the bottom of the hollow part of the tensioner body, form a high pressure oil chamber. A coil spring, located in the high-pressure oil chamber, and in compression between the closed front end of the hollow plunger and the bottom of the hollow part of the tensioner body, urges the hollow plunger in the protruding direction. A reservoir, formed in the tensioner body, has a perimeter positioned to be engaged by a part of a mounting surface on an engine block on which the tensioner body is mounted. A check valve adjacent the bottom of the hollow part of the tensioner body allows oil to flow into the high pressure oil chamber from the reservoir.

A metal bushing is insert-molded in the tensioner body. The bushing has first and second opposite ends, the first end being positioned to engage a part of the mounting surface on an engine block when the tensioner body is mounted on an engine block. The bushing has a central opening, extending along a bushing axis, and adapted to receive a mounting bolt which extends through the central opening of the bushing and into another part of the mounting surface. The bushing also has an outer circumferential surface surrounding the bushing axis, the outer circumferential surface being interrupted by a surface in the form of a flat or a groove extending parallel to the bushing axis. A protrusion extends laterally from a part of the flat or groove. The flat or groove receives a part of the synthetic resin into which the bushing is insert-molded to prevent rotation of the bushing, and the protrusion overlies the part of the resin that is received in the flat or groove to prevent the tensioner body from separating from the mounting surface of the engine block. Preferably, each protrusion is located remote from said first end of the bushing and adjacent the second end of the bushing.

Thus, according to one aspect of the invention, in the formation of the tensioner body by insertion molding, the resin of the tensioner flows against the flat part or parts of the exterior surfaces of the bushings, or into one or more concave grooves on the exterior of the bushing, so that, in the completed tensioner, rotation of the bushings as a result of engine vibration, and resultant loosening of the tensioner mounting bolts, are avoided.

In accordance with another aspect of the invention the lateral protrusions formed on the bushings overlie portions of the synthetic resin adjacent the bushings, preventing the tensioner from separating from the engine block even if the fit between the bushing and the tensioner body becomes loose due to engine vibration, and a large separating force is exerted as a result of oil pressure in the oil reservoir of the tensioner.

According to still another aspect of the invention, since the protrusion on the bushing portion extends from a flat surface of the bushing, or from a concave groove formed in the bushing, it can be formed in the process of cutting or machining the flat surface or groove simply by leaving a front portion of the bushing uncut or unmachined. If the protrusion is formed on the bushing at a location remote from the end of the bushing that engages the engine block, flotation of the tensioner can be reliably prevented.

With this invention, oil leakage from the oil reservoir can be prevented, a sufficient oil supply to the high pressure oil chamber can be maintained, and the generation of backlash noises in a timing chain, due to insufficiency of the holding force applied to the chain by the plunger, can be prevented.

DETAILED DESCRIPTION OF THE PREFERRED EMBODIMENTS

Figure 1:
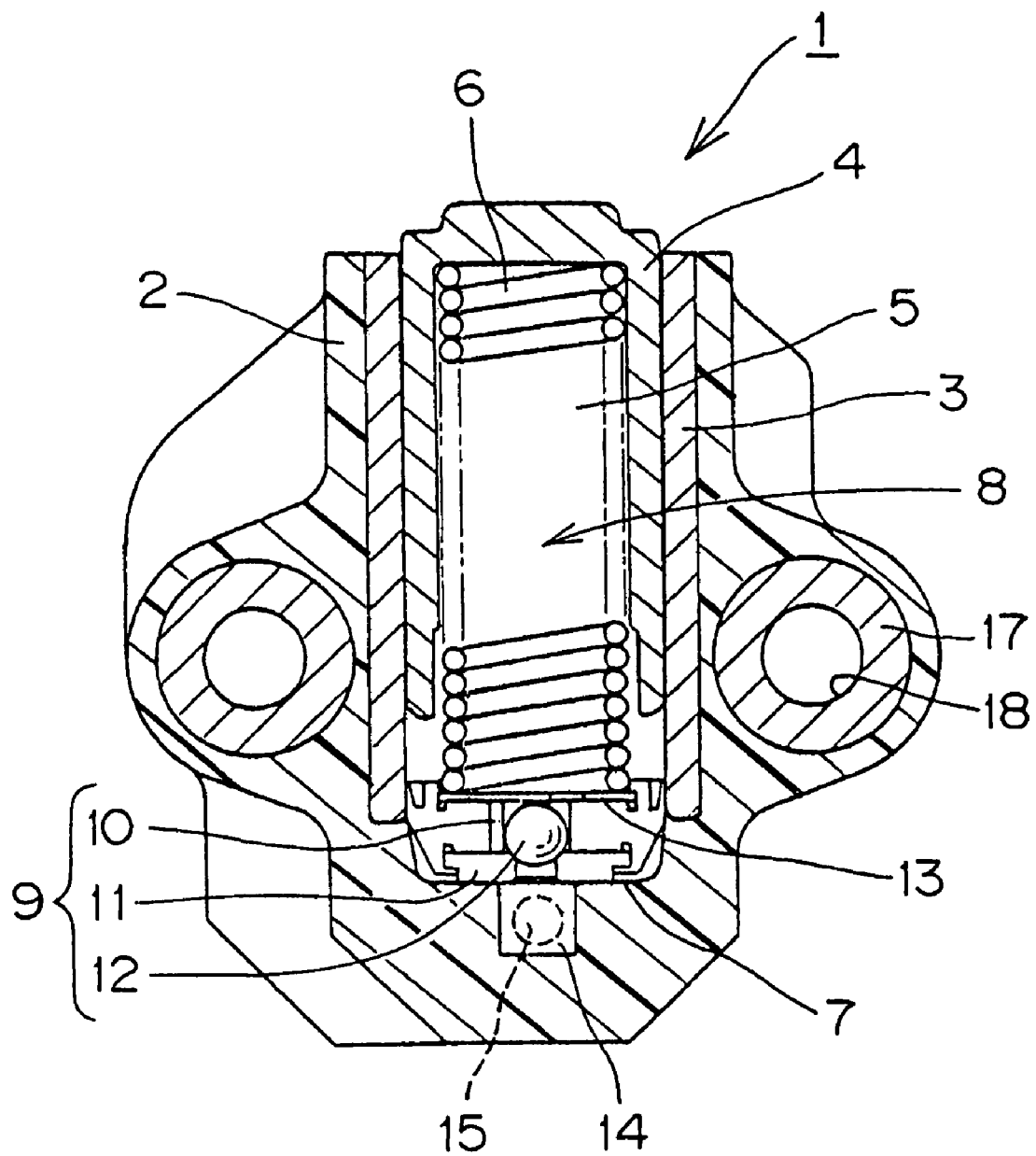
FIG. 1 is across-sectional view of aplastic hydraulic tensioner of in accordance the invention.
Figure 2:
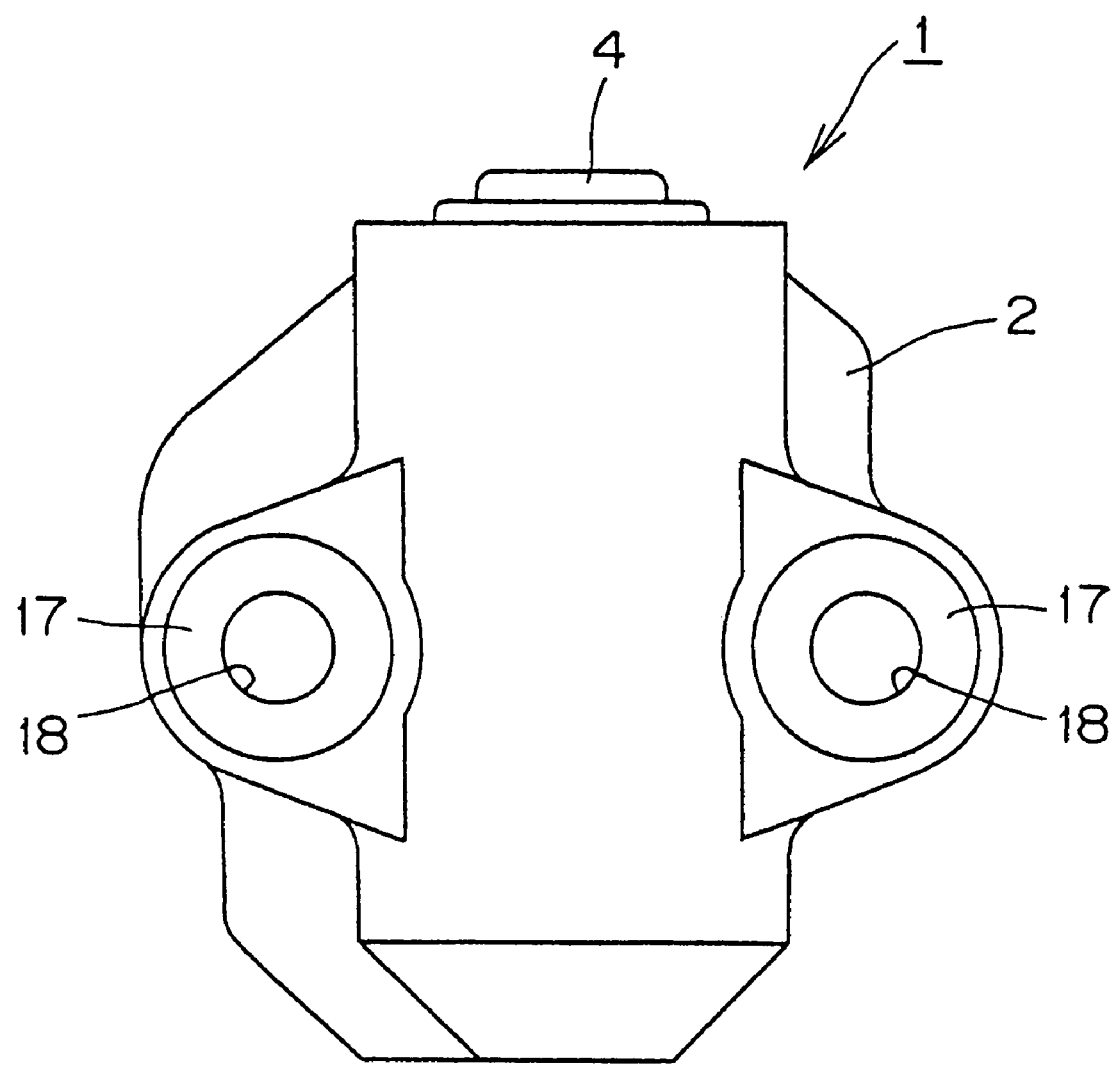
FIG. 2 is a front elevational view of the tensioner.

As shown in FIG. 1, in the plastic hydraulic tensioner 1 according to the invention, a cylindrical metal lining 3 is insert-molded in a plunger-receiving hole formed in a synthetic resin tensioner body 2. A hollow plunger 4 is slidable in the cylindrical lining 3. The plunger has a closed protruding end and an open rear end. A coil spring 6 extends through the open rear end of the plunger into the hollow part 5 of the plunger, and is in compression between the closed protruding end of the plunger, and the bottom 7 of the plunger-receiving hole. The coil spring urges the plunger in the protruding direction.

The closed protruding end of the plunger, the side wall of the plunger, part of the interior of the cylindrical metal lining 3, and a part of the bottom of the plunger-receiving hole below the bottom end of the metal lining, together form a high pressure oil chamber 8. A check valve 9 is provided at the bottom of the plunger-receiving hole to permit the flow of oil into the high pressure oil chamber 8 while blocking reverse flow of oil. The check valve 9 comprises a ball guide 10, a retainer 13 against which the compression spring 6 bears, a ball seat 11, a check ball 12, which is arranged to close a through hole in the ball seat 11.

Figure 3:
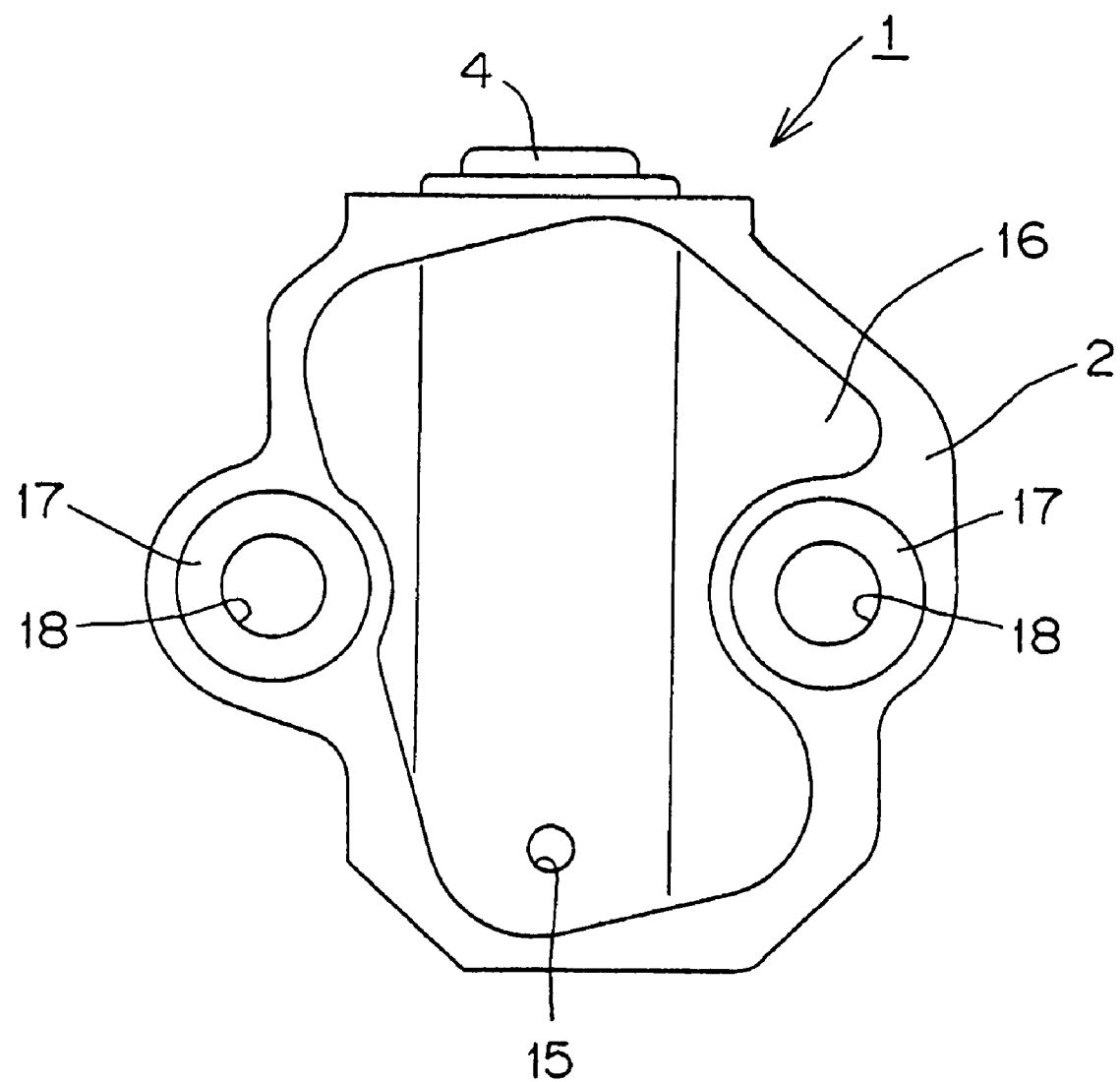
FIG. 3 is a rear elevational view of the tensioner, showing an oil reservoir surrounded by a surface which engages a mounting surface of an engine block.
Figure 4:
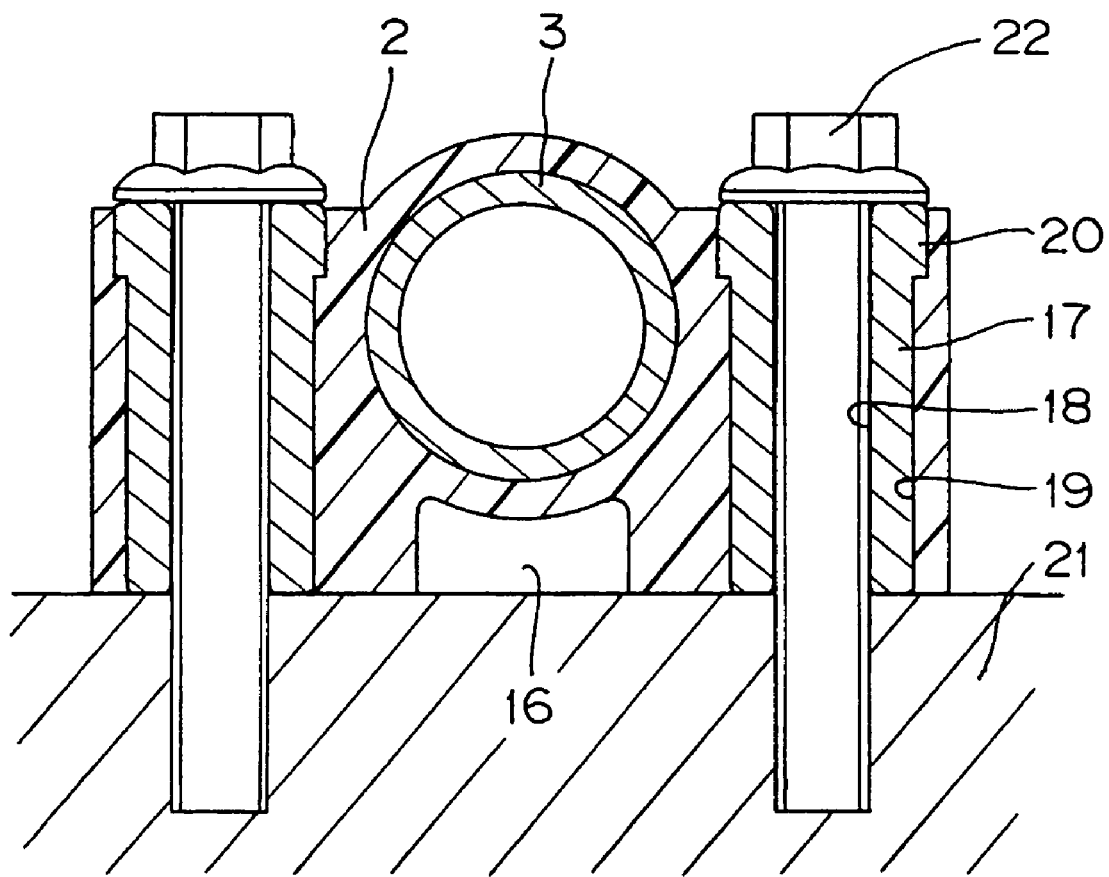
FIG. 4 is a cross-sectional view illustrating the tensioner mounted on an engine block (not showing the plunger)
Figure 5:
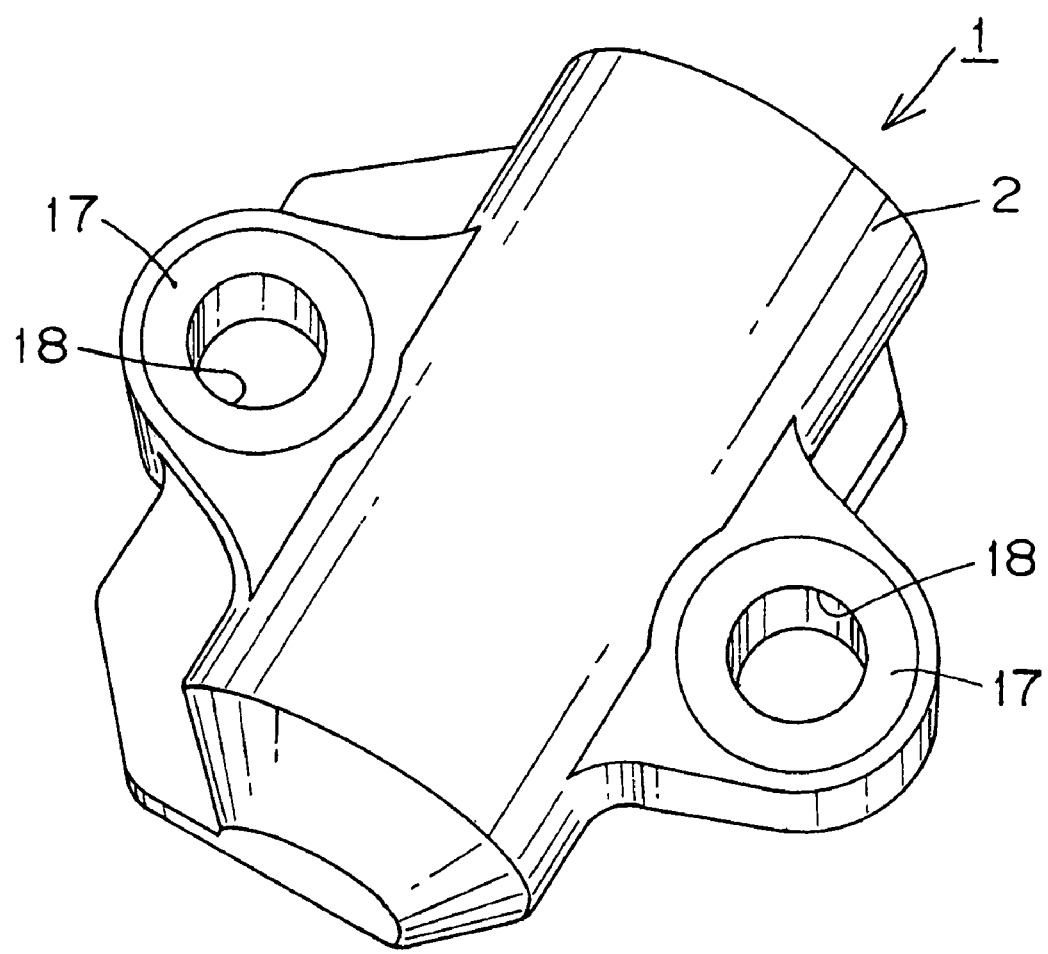
FIG. 5 is a perspective view showing the front side of the tensioner.
Figure 6:
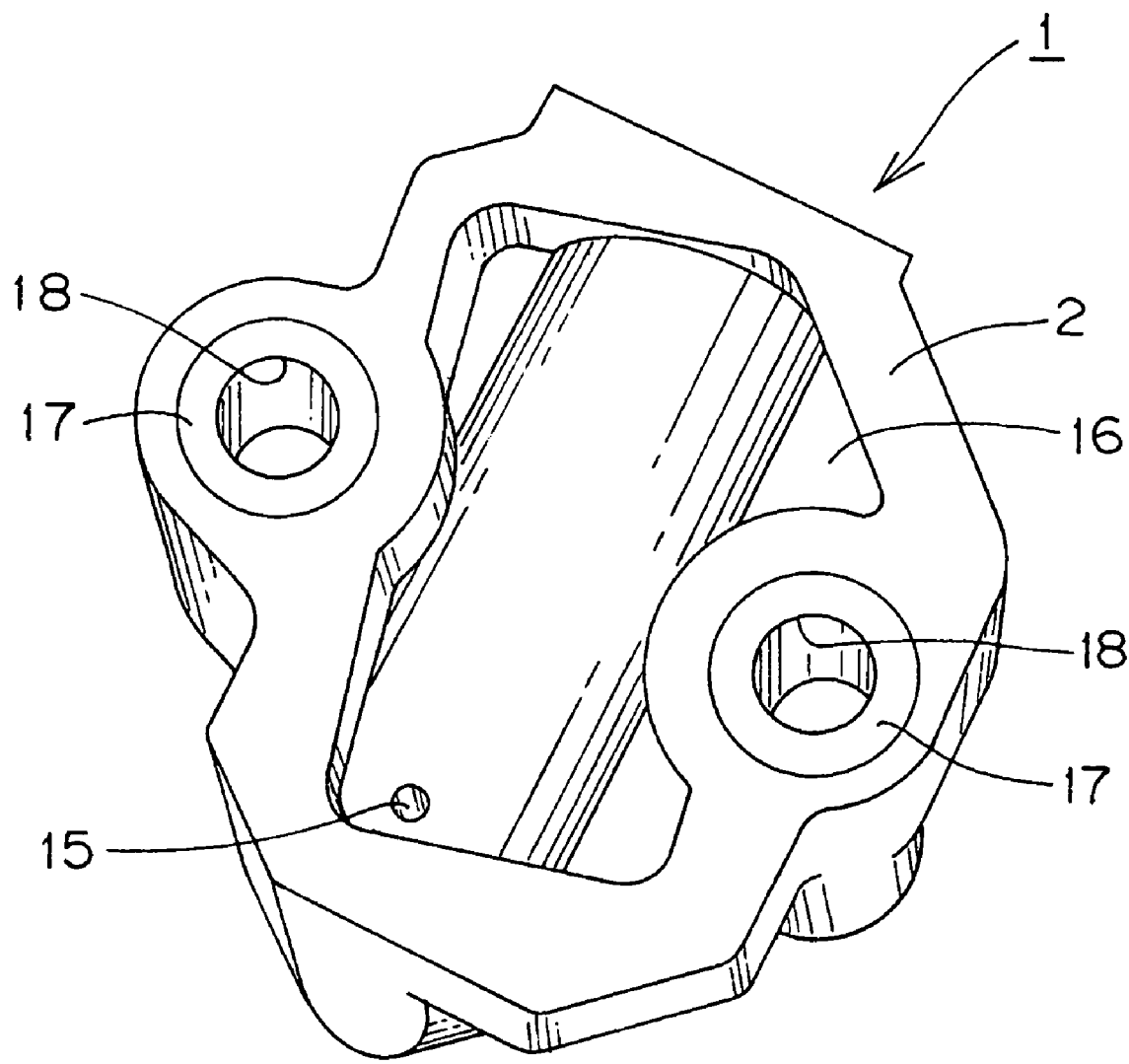
FIG. 6 is a perspective view showing the mounting surface side of the tensioner.
Figure 7:
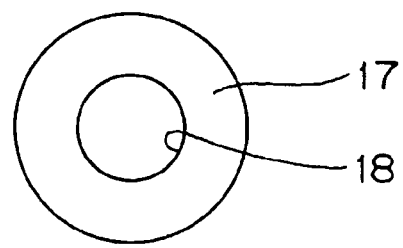
FIG. 7 is a top plan view of a first version of a metal bushing used in the tensioner.

As shown in FIGS. 3, 4 and 6, an oil reservoir 16, which supplies oil to the high pressure oil chamber 8, is formed in the tensioner body 2 on the side which engages a mounting surface on an engine block. Oil passages 14 and 15 in FIG. 1 connect the reservoir 16 to the upstream side of the check valve 9.

Figure 8:
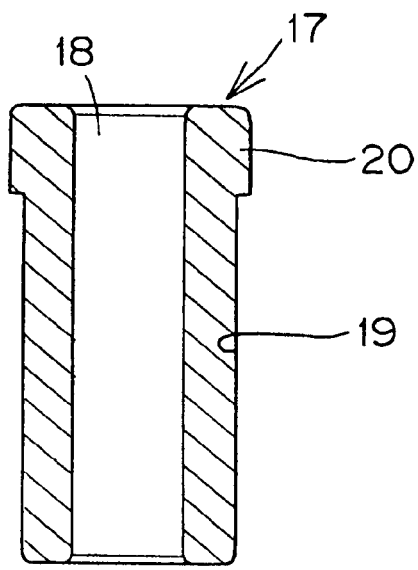
FIG. 8 is a cross-sectional view of the metal bushing.
Figure 9:
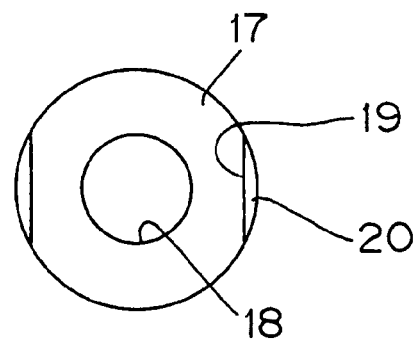
FIG. 9 is a bottom plan view of the metal bushing.

Metal bushings 17 are insert-molded in the tensioner body 2. Each bushing has a hole 18 through which a mounting bolt 22 extends for mounting the tensioner on an engine block 21 as shown in FIG. 4. In a first embodiment, the outer circumferential surface of a metal bushing 17 is provided with at least one flat surface 19 disposed in parallel relationship to the direction of the axis of the bushing 17. Each of the bushings shown in FIG. 4 has two such flat surfaces, as shown in detail in FIGS. 8 and 9. As shown in FIG. 8, the flat surfaces extend from an intermediate position along the length of each bushing toward the end that contacts the engine block (FIG. 4). Therefore, as seen in FIGS. 4, 8 and 9, each bushing has protrusions 20 that overlie portions of the synthetic resin tensioner body that contact the flat surfaces 19.

When the tensioner 1 is mounted on an engine block 21, as shown in FIG. 4, the high pressure oil chamber is filled with oil, and the reservoir 16 is hermetically sealed. Oil is supplied under pressure to the oil reservoir 16 by a pump, usually the engine oil pump, through a passage (not shown) in the engine block, which communicates with the oil reservoir 16 of the tensioner. When the engine timing chain becomes loose, the plunger 4 moves in the protruding direction to take up excess slack in the chain. As the plunger the tensioner moves in the protruding direction, the check valve 9 opens to allow oil to flows from the oil reservoir into the high pressure oil chamber 8 of the tensioner. When tension in the chain is restored, the check ball 12 closes the through hole in the ball seat 11 so that the check valve 9 is closed.

During insert molding of the tensioner, resin of the tensioner body conforms to the flat parts 19 and the protrusions 20 of the bushings. Because the resin conforms to the flat parts of the bushings 17, the bushings cannot rotate. Thus, vibration of the engine cannot cause the bushings to rotate, and loosening of the mounting bolts 22 due to rotation of the bushings is prevented.

Furthermore longitudinal movement of the tensioner body along the bushings is prevented by the protrusions 20. Therefore, even if the fit between the tensioner body 2 and a metal bushing 17 becomes loose, as a result of engine vibration, for example, the protrusion or protrusions 20 will prevent the tensioner body from separating from the tensioner mounting surface on the engine block despite the application of a separating force resulting from oil pressure in the oil reservoir 16. Accordingly, leakage of oil from the reservoir 16 is prevented, and the supply of oil to the high pressure oil chamber 8 is maintained at a level sufficient to avoid timing chain backlash and the generation of backlash noise.

The protrusions are readily formed on a bushing simply by machining the flat portions along part of the length of the bushing, leaving protrusions at the ends of the bushings remote from the ends that contact the engine block. The protrusions 20 are preferably located remote from the engine block-contacting ends of the bushings 17 for more reliable prevention of separation of the tensioner body from the engine block.

Figure 10:
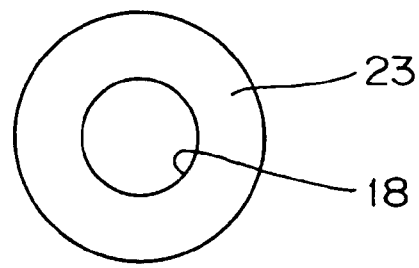
FIG. 10 is a plan view of an alternative metal bushing.
Figure 11:
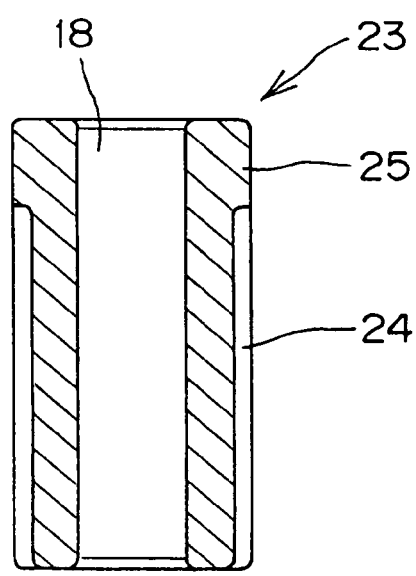
FIG. 11 is a cross-sectional view of the alternative bushing.
Figure 12:
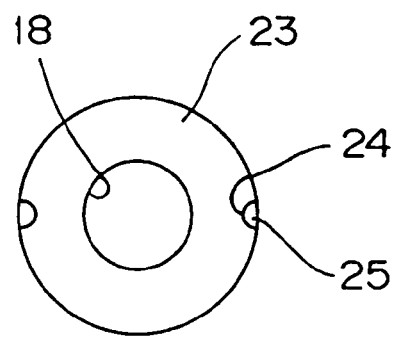
FIG. 12 is a bottom plan view of the alternative bushing.
Figure 13:
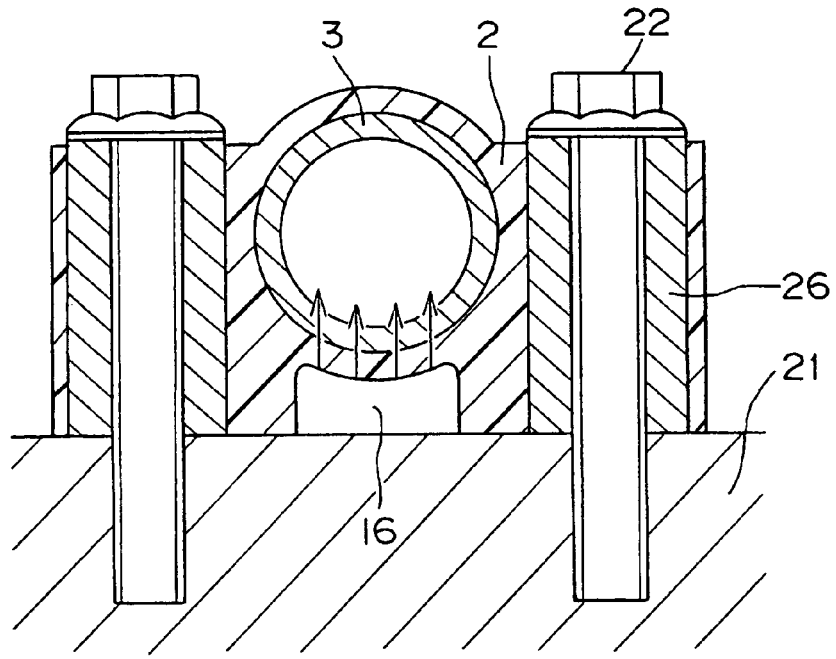
FIG. 13 is a cross-sectional view illustrating the mounting of a conventional hydraulic tensioner on an engine block (not showing the plunger.
Figure 14:
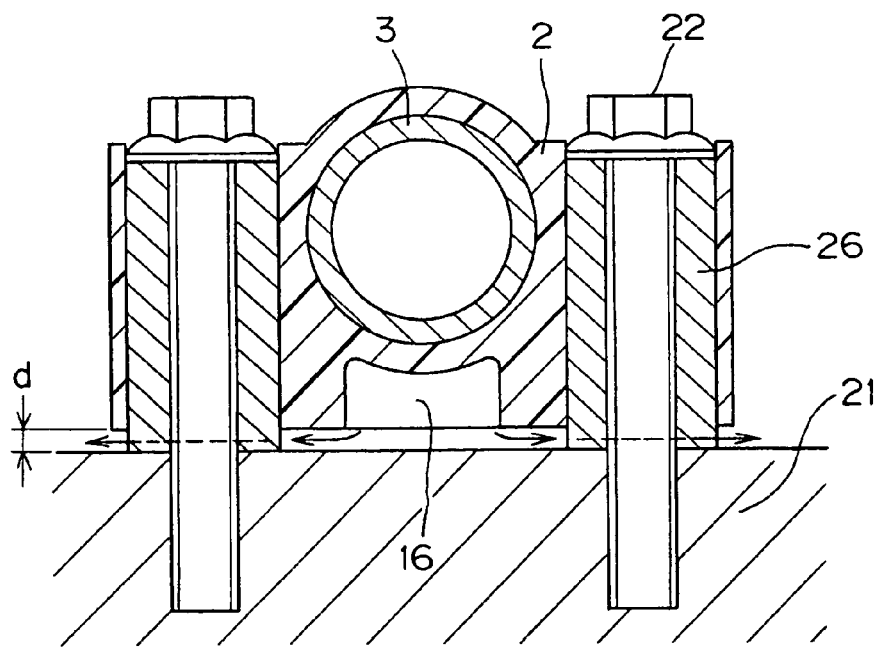
FIG. 14 is a cross-sectional view, corresponding to FIG. 13, but illustrating a condition in which the tensioner body has separated from the engine block.

In the alternative embodiment of the bushing, illustrated in FIGS. 10-12, the metal bushing 23 is formed with at least one concave groove 24, extending parallel to the axis of the bushing on an outer circumferential surface of the bushing. In the example shown, two such grooves are formed, and are located on opposite sides of the bushing. Protrusions 25 are formed, adjacent the ends of the groove 24 remote from the engine block-contacting end of the bushing 23. As in the case of the bushing having flats, the protrusions are preferably formed by machining the grooves along a portion of the length of the bushing extending from a location spaced from the outer end of the bushing toward the engine block-contacting end. Thus, the unmachined portions constitute the protrusions. The grooves shown have a semicircular cross-section, as seen in FIG. 12. However, the grooves can have rectangular, or other cross-sectional shapes.

In the insertion molding process, the resin of the tensioner body 2 enters the concave grooves 24. The presence of resin in the groove or grooves prevents the bushing from rotating as a result of engine vibration, and even if the fit between the bushing and the tensioner body becomes loose, the protrusion or protrusions prevent the tensioner body from separating from the tensioner mounting surface on the engine block. Thus, oil leakage is avoided, and an adequate oil supply to the high pressure oil chamber of the tensioner is maintained as in the case of the embodiment in which the bushings are formed with flats.

The metal bushings according to the invention can be formed from a variety of suitable metals, including but not limited to, various steels and aluminum alloys. The flat surfaces and concave grooves in the bushings, and the protrusions, can be formed die casting or forging, as well as by cutting or machining.

I claim:

1. A hydraulic tensioner comprising:
a tensioner body composed of synthetic resin and having a hollow part formed therein for receiving a hollow cylindrical lining, said hollow part being open at one end and having a bottom;
a hollow cylindrical lining provided in said hollow part of the tensioner body;
a hollow plunger slidable in the cylindrical lining, the plunger having an open rear end, and a closed front end protrudable from said cylindrical lining in a protruding direction;
said hollow part of the plunger, said cylindrical lining, and the bottom of the hollow part of the tensioner body forming a high pressure oil chamber;
a coil spring, located in said high pressure oil chamber, and in compression between said closed front end of the hollow plunger and said bottom of the hollow part of the tensioner body, said coil spring urging the hollow plunger in the protruding direction;
a reservoir formed in said tensioner body, said reservoir having a perimeter positioned to be engaged by a part of a mounting surface on an engine block on which the tensioner body is mounted;
a check valve adjacent said bottom of the hollow part of the tensioner body for allowing oil to flow into said high pressure oil chamber from said reservoir; and
a metal bushing insert-molded in said tensioner body, said bushing having first and second opposite ends, the first end being positioned to engage a part of said mounting surface on an engine block when the tensioner body is mounted on an engine block, the bushing having a central opening, extending along a bushing axis, and adapted to receive a mounting bolt which extends through the central opening of the bushing and into another part of said mounting surface;
said bushing also having an outer circumferential surface surrounding said axis, the outer circumferential surface being interrupted by a surface in the form of a flat or a groove extending straight and parallel to said axis; and a protrusion extending laterally from a part of said flat or groove, said flat or groove receiving a part of the synthetic resin into which the bushing is insert-molded to prevent rotation of the bushing, and said protrusion overlying the part of the synthetic resin that is received by the flat or groove to prevent the tensioner body from separating from the mounting surface of the engine block;
in which the bushing is formed with a continuous wall surrounding the bushing axis, said wall having an inner circumferential surface, and in which said flat or groove that interrupts the outer circumferential surface of the bushing extends from said outer circumferential surface to, an intermediate location between said outer circumferential surface and said inner circumferential surface and terminates at said intermediate location, whereby said synthetic resin is prevented from flowing into the central opening of the bushing.

* * * * *